(12) United States Patent
Sitaraman et al.

(10) Patent No.: US 6,718,332 B1
(45) Date of Patent: *Apr. 6, 2004

(54) SEAMLESS IMPORTATION OF DATA

(75) Inventors: Aravind Sitaraman, Santa Clara, CA (US); Houshang Nayeb Hosseini, Redwood Shores, CA (US); Jie Chu, Los Altos, CA (US); Sampath Kumar Sthothra Bhasham, Santa Clara, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,263

(22) Filed: Jan. 4, 1999

(51) Int. Cl.⁷ .................................................. G06F 7/00
(52) U.S. Cl. ............................ 707/102; 707/4; 707/100; 707/202; 709/246
(58) Field of Search ..................... 707/1–10, 100, 707/102, 103, 104, 204; 709/227, 238, 239, 246

(56) References Cited

U.S. PATENT DOCUMENTS

| | | | |
|---|---|---|---|
| 4,827,411 A | | 5/1989 | Arrowood et al. ............ 364/300 |
| 5,257,369 A | * | 10/1993 | Skeen et al. ................. 709/229 |
| 5,421,001 A | * | 5/1995 | Methe ............................ 707/1 |
| 5,421,006 A | | 5/1995 | Jablon et al. ................ 395/575 |
| 5,490,088 A | | 2/1996 | Landis et al. ............ 364/514 C |
| 5,524,253 A | * | 6/1996 | Pham et al. ................. 709/202 |
| 5,560,005 A | | 9/1996 | Hoover et al. .............. 395/600 |
| 5,608,898 A | | 3/1997 | Turpin et al. .............. 395/619 |
| 5,615,372 A | * | 3/1997 | Nishina ..................... 707/104.1 |
| 5,621,721 A | | 4/1997 | Vatuone ....................... 370/16 |
| 5,623,662 A | | 4/1997 | McIntosh .................... 395/619 |
| 5,721,909 A | * | 2/1998 | Oulid-Aissa et al. ......... 707/10 |
| 5,752,242 A | | 5/1998 | Havens ......................... 707/3 |
| 5,826,270 A | * | 10/1998 | Rutkowski et al. ........... 707/10 |
| 5,832,522 A | | 11/1998 | Blickenstaff et al. ....... 707/204 |
| 5,873,103 A | | 2/1999 | Trede et al. ................ 707/204 |
| 5,937,415 A | * | 8/1999 | Sheffield et al. ............ 707/204 |
| 5,958,016 A | * | 9/1999 | Chang et al. ............... 709/229 |
| 5,966,717 A | * | 10/1999 | Sass ........................... 707/204 |
| 5,970,490 A | * | 10/1999 | Morgenstern ................ 707/10 |
| 5,974,417 A | * | 10/1999 | Bracho et al. ................ 707/10 |
| 6,044,372 A | * | 3/2000 | Rothfus et al. ............... 707/10 |
| 6,047,280 A | * | 4/2000 | Ashby et al. .................. 707/2 |

(List continued on next page.)

OTHER PUBLICATIONS

Bracho, Dr. Rafael, "Integrating the Corporate Computing Environment with Active Software", Nov. 18, 1998, Active Software, pp. 1–17.

IBM, "IBM introduces new subscriber management system for Internet service providers", Dec. 2, 1998, IBM News, p. 1.

*Primary Examiner*—Kim Vu
*Assistant Examiner*—Anh Ly
(74) *Attorney, Agent, or Firm*—Thelen Reid & Priest LLP

(57) ABSTRACT

A data transfer interface for importing data from a source system to a target system, including a source data adapter having an attribute definition transcriber for generating transcribed data, and a target data adapter having a data format converter for converting the transcribed data from a first format to a second format. The data transfer interface may include a data validator to ensure that the user data selected for importation is valid before the data is transcribed. The source data adapter and the target data adapter may be configured for use with a communications architecture that allows the source data adapter and the target data adapter to receive and transmit user data as events on a data communications network.

58 Claims, 3 Drawing Sheets

U.S. PATENT DOCUMENTS

| | | | | |
|---|---|---|---|---|
| 6,070,192 | A | * | 5/2000 | Holt et al. .................. 709/227 |
| 6,094,684 | A | * | 7/2000 | Pallmann .................... 709/227 |
| 6,094,688 | A | * | 7/2000 | Mellen-Garnett et al. ... 709/328 |
| 6,134,559 | A | * | 10/2000 | Brumme et al. ............ 707/103 |
| 6,148,329 | A | * | 11/2000 | Meyer ....................... 709/206 |
| 6,154,748 | A | * | 11/2000 | Gupta et al. ................ 707/102 |
| 6,167,405 | A | * | 12/2000 | Rosensteel et al. ......... 707/102 |
| 6,199,068 | B1 | * | 3/2001 | Carpenter ................... 707/100 |
| 6,202,099 | B1 | * | 3/2001 | Gillies et al. ............... 709/317 |
| 6,212,550 | B1 | * | 4/2001 | Segur ......................... 707/10 |
| 6,243,749 | B1 | * | 6/2001 | Sitaraman et al. .......... 709/223 |
| 6,256,676 | B1 | * | 7/2001 | Taylor et al. ............... 709/246 |
| 6,263,369 | B1 | * | 7/2001 | Sitaraman et al. .......... 709/225 |
| 6,298,383 | B1 | * | 10/2001 | Gutman et al. ............. 709/229 |
| 6,304,915 | B1 | * | 10/2001 | Nguyen et al. ............. 709/250 |
| 6,333,931 | B1 | * | 12/2001 | LaPier et al. ............... 370/385 |
| 6,427,170 | B1 | * | 7/2002 | Sitaraman et al. .......... 709/226 |
| 6,430,619 | B1 | * | 8/2002 | Sitaraman et al. .......... 709/225 |
| 6,442,588 | B1 | * | 8/2002 | Clark et al. ................. 709/219 |
| 6,466,977 | B1 | * | 10/2002 | Sitaraman et al. .......... 709/225 |
| 6,498,791 | B2 | * | 12/2002 | Pickett et al. ............... 370/353 |
| 6,510,429 | B1 | * | 1/2003 | Todd .......................... 707/10 |
| 6,510,465 | B1 | * | 1/2003 | Bilansky et al. ............ 709/227 |
| 6,549,956 | B1 | * | 4/2003 | Bass et al. .................. 709/328 |

* cited by examiner

SEAMLESS IMPORTATION OF DATA

BACKGROUND OF THE INVENTION

1. Field of the Invention

The present invention relates to the importation of data from a source database to a target database. More particularly, the present invention relates to a data transfer interface for importing data from an existing information system having a source database to a new information system having a target database.

2. The Background

Many companies, such as telephone companies and Internet Service Providers (ISPs), rely on subscriber management systems, such as those provided, for example, by Portal Software, Inc. of Cupertino, Calif., and Solect Technology Group of Toronto, Ontario, Canada. A subscriber management system enables companies to store and retrieve subscriber information, such as account type, personal information, password, and the like, when needed. Subscriber information is stored in one or more databases having a database schema and in a format compatible with one or more applications or components that use subscriber information. (A schema is the definition of an entire database).

The cost of entering and maintaining subscriber information in these systems is expensive, representing a sizable investment. Thus, many companies wishing to add a new component or system to their business enterprise often seek to leverage their subscriber information by integrating the new system with their subscriber management system. However, integrating new and old systems involves significant technical issues because the new system may use a database having a schema that differs from the existing database schema, data formats may be different, and there may be other differences as well.

Traditionally, companies have relied on systems integrators to resolve such compatibility issues but this increases integration costs, requires divulging sensitive subscriber information, business practices, and models to the systems integrators, affects the productivity of employees engaged in supporting the integration effort, and potentially compromises database security—all without any guarantee that the integration effort will be successful.

Consequently, a need exists for a uniform scheme for importing data from an existing system to a new system which decreases the cost of integrating a new system that uses the imported data, reduces the need to reveal information used in the existing system, reduces the need to access the exiting system's database, and avoids dependence on existing data formats.

SUMMARY OF THE INVENTION

A data transfer interface for importing data from a source system to a target system, including a source data adapter having an attribute definition transcriber for generating transcribed data, and a target data adapter having a data format converter for converting the transcribed data from a first format to a second format. The data transfer interface may include a data validator to ensure that the data selected for importation is valid before the data is transcribed. The source data adapter and the target data adapter may be configured for use with a communications architecture that allows the source data adapter and the target data adapter to receive and transmit user data as events on a data communications network.

DETAILED DESCRIPTION OF THE PREFERRED EMBODIMENTS

In the following description, preferred embodiments of the invention are described with regard to preferred components, process steps, and data structures. Those skilled in the art will recognize, after a perusal of this application, that embodiments of the invention may be implemented using at least one general purpose computer operating under program control, and that modification of the general purpose computer to implement the components, process steps, and data structures described would not require undue invention.

In accordance with a presently preferred embodiment of the present invention, the components, process steps, and data structures may be implemented using C++ programs running on an Enterprise 2000 server™ running Sun Solaris™ as its operating system unless otherwise described. The Enterprise 2000 server™ and Sun Solaris™ operating system are available from Sun MicroSystems, Inc. of Mountain View, Calif. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA or ASIC technology, and the like, may also be used without departing from the scope and spirit of the inventive concepts disclosed.

Figure 1:
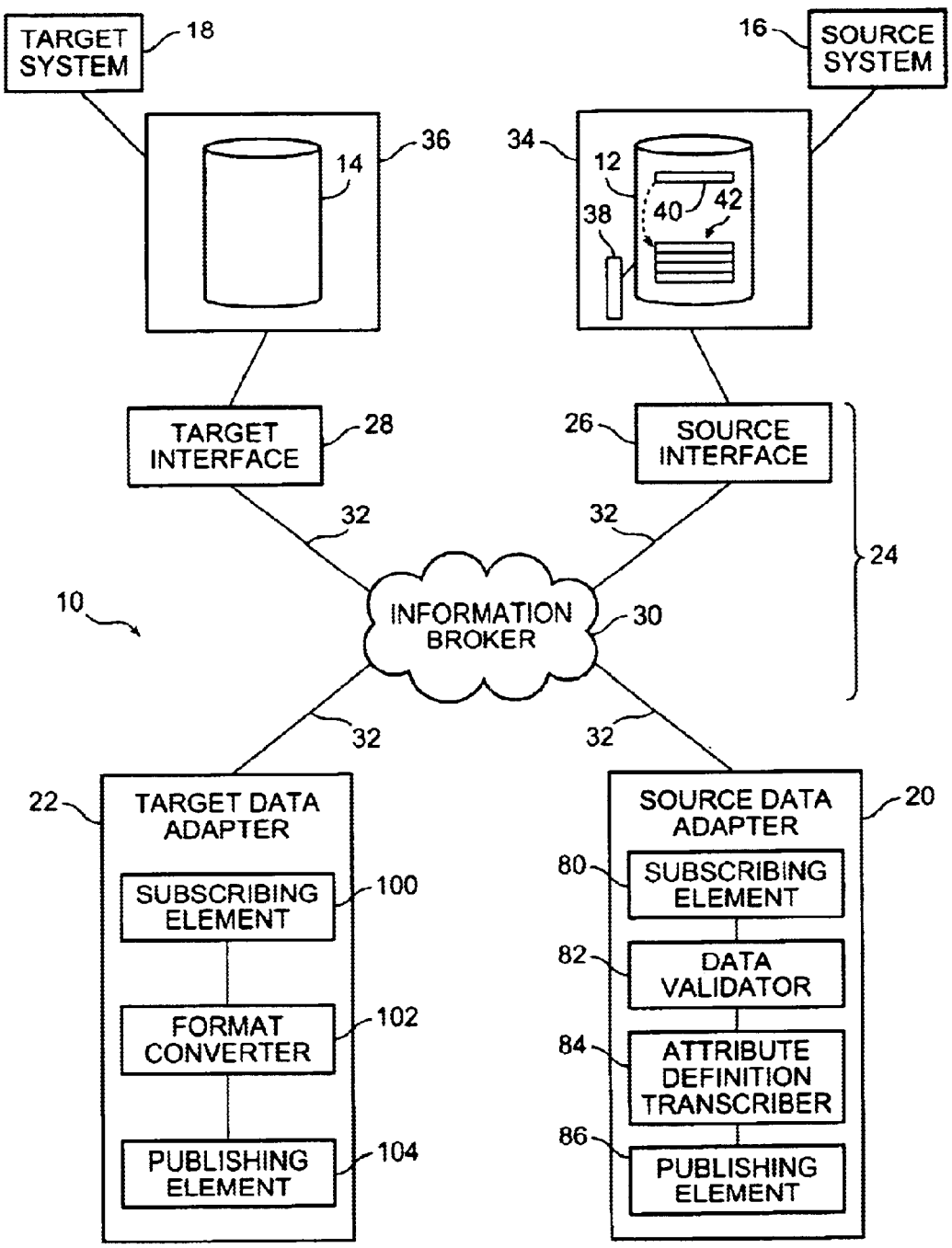
FIG. 1 is a system block diagram of a data transfer interface for importing data from a source database to a target database in accordance with a presently preferred embodiment of the present invention.

FIG. 1 is a system block diagram of a data transfer interface 10 for importing data from a source location, such as source database 12, to a target location, such as target database 14. For the purposes of this application, a database is any electronically stored collection of data, such as a set of interrelated files created and managed by a DBMS (database management system). Those of ordinary skill in the art will readily appreciate that source database 12 has a database definition or schema suitable for use with the applications, protocols, and the like associated with a system, such as source system 16. Similarly, target database 14 has a database definition suitable for use in another system, such as target system 18.

Source system 16 may be a subscriber management system that holds system data, such as user data including a user's name, address, telephone number, account type, and the like, in source database 12. Target system 18 may include applications, protocols, and functions that require all or portions of the user data stored in source database 12 to be in a format that is more than likely different from the format defined by the schema of source database 12. For example, the user data stored in source database 12 may have a record structure that is different from the record structure used in target database 14. The record fields needed by target system 18 may also be in separate tables and/or in databases. Equivalent field content may also have different field labels, e.g., a field holding a user's first name may have a field name of "fname" or "first_name". Equivalent field content expected by target system 18 may also be in more than one field, e.g., a user's name might be stored in source database 12 in two different fields, a field for the first name and a field for the last name. Equivalent field content may also have mismatched values. For example, an IP address value may be stored in numerical form, e.g., 111.222.333.444 in source system 16 but target system 18 may require the same IP address to be stored as a domain name in the form of a string, e.g., www.company.com, or vice versa.

Data transfer interface 10 includes a source data adapter 20 and a target data adapter 22, which use a communications architecture 24 to transfer data among themselves, source database 12, and target database 14. Communications architecture 24 includes a source-interface 26, a target interface 28, and an information broker 30 and operates by relaying events among clients over an intranet, the Internet, or equivalent data communications network 32 which may also be known by the term "information bus". Clients transmit and/or receive events from information broker 30 and have subscribing and/or publishing elements. A client transmits data by using a publishing element to transmit the data as an event on data communications network 32, while a client receives data by using a subscribing element to receive the data as an event published on data communications network 32. Each event is defined according to an event type, which enables clients to distinguish between events by their event types. Each publishing element associated with a client and the type of events that are to be published by the client must be registered with information broker 30. Similarly, each publishing element associated with a client and the type of events that are to be received by the client must be registered with information broker 30.

Information broker 30 delivers published events to subscribing elements according to event type. For each event received, information broker 30 determines the event type of the received event and whether a subscribing element exists that is registered to receive events with that event type. If so, information broker 30 delivers the event to the subscribing element. Otherwise, information broker 30 drops the event and proceeds to process the next available event. For example, if a subscribing element is registered to receive an event of an event type "data transfer" (data transfer event) then that subscribing element will receive each data transfer event published to and received by information broker 30. In accordance with a presently preferred embodiment of the present invention, source data adapter 20, target data adapter 22, source interface 26, and target interface 28 are clients of information broker 30 and are registered (through their respective publishing and subscribing elements) with information broker 30.

Using the above approach provides the following advantages. First, the number of publishing elements and subscribing elements is easily scalable. Neither adding or deleting subscribing elements has an affect on publishing elements, nor does adding or deleting publishing elements have an affect on subscribing elements (unless, of course, no publishing element remains that transmits an event subscribed to and required by a subscribing element). For example, adding a new publishing element does not require modifying existing subscribing elements that subscribe to the events published by the new publishing element. Similarly, adding a new subscribing element to receive an existing event does not require updating the publishing element that publishes the existing event. Instead, the new publishing or subscribing element may be added simply by registering the event to be transmitted or received with an information broker. Second, because an information broker manages event delivery, an unavailable subscribing element will not delay a publishing element and will only receive events when the subscribing element can do so.

Communications architecture 24 may preferably be implemented using a Common Object Request Broker Architecture (CORBA)-based system and an Enterprise Application Integration (EAI) system, such as the Active Web product from Active Software of Santa Clara, Calif. Using the Active Web product is not intended to be limiting in any way. Other equivalent products or equivalent designs may be used to provide the functionality described.

Source interface 26 and target interface 28 are application interfaces that enable an application to transmit and/or receive data as an event on communications architecture 24. The application supported by source interface 26 is a DBMS 34 (database management system) managing source database 12, while the application supported by target interface 28 is a DBMS 36 managing target database 14. DBMS 34 and DBMS 36 correspond to source system 16 and target system 18, respectively. Source interface 26 translates user data, which is received by source interface 26 from a database trigger 38, into an event, enabling the transmission of the user data to a client that subscribes to that event.

Source interface 26 relies on database trigger 38, which is part of DBMS 34, to obtain user data held by source database 12 within a database record 40. The user data is stored in the form of a user record, which has a format and description defined by a source table 42. Database trigger 38 transmits the user record to source interface 26 each time a record location within source table 42 is populated or filled with user data. Populating a record location within source table 42 may be performed manually or by any means known by those of ordinary skill in the art.

Upon receiving the user record, source interface 26 transmits the user record to source data adapter 20. In accordance with a presently preferred embodiment of the present invention, source interface 26 transmits the user record by publishing the user record as an event having an event type that is the same as the event type that source data adapter 20 has registered to receive from information broker 30. For example, source interface 26 may transmit each user record as a data transfer event on communications architecture 24, while source data adapter 20 may receive each user record as a data transfer event. The use of a data transfer event type is not intended to be limiting in any way. Other event types may be used as long as the event type used by source interface 26 to publish the user record corresponds to the event type used by source data adapter 20 to receive the user record.

Upon receipt of the event containing the user record by source data adapter 20, source data adapter 20 preferably validates the contents of the user record. If source data adapter finds the contents of the user record valid, source data adapter 20 transcribes the contents and transmits the validated and transcribed user record to target data adapter 22. If source data adapter 20 does not find the contents valid, source data adapter 20 drops the user record, sends an alert message to an operator, and waits for another event containing a user record to process. These actions performed by source data adapter 20 are further discussed below.

Target interface 28 receives the user record processed by target data adapter 22. In accordance with a presently preferred embodiment of the present invention, target interface 28 receives the user record as an event that has the same event type as the events published by target data adapter 22. Upon receipt of each event, target interface 28 strips the user record from the event and provides it to DBMS 36 by using a language or protocol compatible with DBMS 36, such as SQL (structured query language). Target interface 28 and target data adapter 22 are further discussed below.

Source interface 26 and target interface 28 are implemented using the dbAdapter product from Active Software. The dbAdapter product is compatible with a variety of popular database products from Informix Corporation of Menlo Park, Calif.; Oracle Corporation of Redwood Shores, Calif.; Microsoft Corporation of Redmond, Wash.; IBM of Poughkeepsie, N.Y.; and Sybase Corporation, of Emeryville, Calif. The dbAdapter product may be installed on source system 16 if source system 16 supports a UNIX or Windows NT® operating system. If source system 16 does not support either operating system, the dbAdapter product may be installed on a separate platform (not shown) running UNIX or Windows NT® with the platform coupled via a network to the platform running the database. Other applications operating on other operating systems are also within the scope of the present invention.

Database trigger 38 is triggered by DBMS 34 on the direction of source interface 26. Once triggered, database trigger 38 monitors source table 42 so that each time data corresponding to a user is stored in a record within source table 42, database trigger 38 transmits the user record to source interface 26. Database trigger 38 may be implemented using a stored procedure in a database DBMS, such as those available from the companies listed above.

Figure 2:
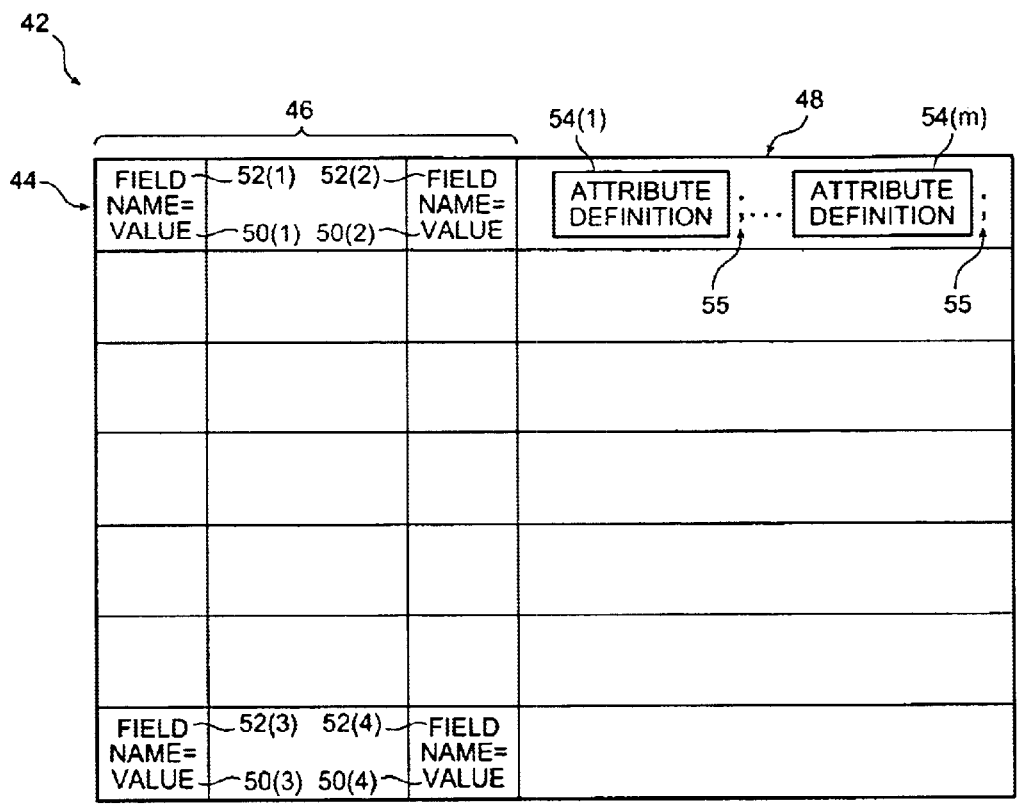
FIG. 2 is a diagram of a storage format for data stored in a source location in accordance with a presently preferred embodiment of the present invention.

As shown in FIG. 2, source table 42 has a storage format that includes at least one "row" 44 having at least one keyword "column" 46 and at least one attribute definition column 48. Each row in source table 42 provides a memory location or record for holding data corresponding to a user according to the format defined by the columns. Each "intersection" of a row 44 and a keyword column provides a memory location for holding a keyword value, such as keyword values 50(1), 50(2), 50(3), and 50(n) and a corresponding field name, such as field names 52(1), 52(2), 52(3), and 52(n). Similarly, attribute definition column 48 provides a memory location for holding a variable number of attribute definitions for each row 44, such as attribute definitions 54(1) through 54(n), with each attribute definition separated by a delimiter 55, such as a semicolon or equivalent delimiter.

Figure 3:
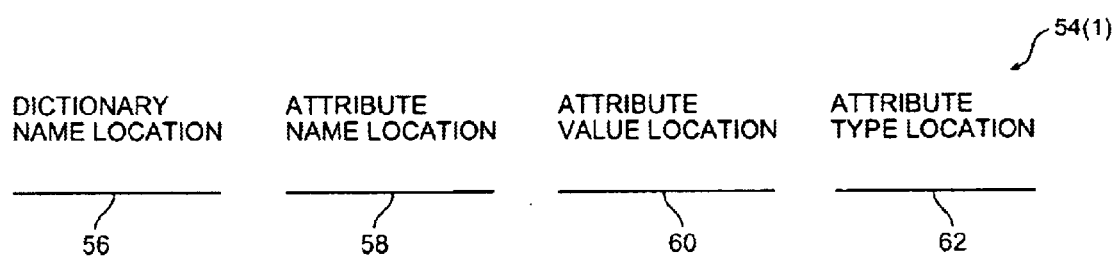
FIG. 3 is a diagram of an attribute definition in accordance with a presently preferred embodiment of the present invention.

As shown in FIG. 3, in accordance with a presently preferred embodiment of the present invention, each attribute definition, such as attribute definition 54(1), includes four attribute definition locations that each holds a value describing the attribute definition. The four attribute definition locations include a dictionary name location 56, an attribute name location 58, an attribute value location 60, and an attribute type location 62. The locations are separated by a semicolon, or equivalent delimiter, and hold values in human readable form, facilitating the process of transferring user records from source database 12 to source table 42. Dictionary name location 56 holds a name of a dictionary that defines a protocol used by target system 18. Attribute name location 58 holds an attribute name of one of the attributes defined by the dictionary listed in dictionary name location 56, while attribute value location 60 holds the value of the attribute listed in attribute name location 58. Attribute type location 62 holds the name of the attribute type of the attribute listed in attribute name location 58.

The storage format shown in FIGS. 2 and 3 provides a record format that is of sufficient flexibility to support many types of data record formats from different types of database schemas. Yet, it is also sufficiently uniform to allow data transfer interface 10 to obtain and process the necessary data required for proper importation. For example, source system 16 may be a subscriber management system used by an ISP, and target system 18 may be a system that offers unified authentication, authorization, and accounting (AAA) services across a wide-array of network access points, such as the 4User Control Point (UCP) product available from Cisco Systems, Inc. of San Jose. The subscriber management system may have a source location, such as source database 12, for holding and maintaining user data. The user data may include a user's name that corresponds to one of the ISP's applications, such as a stand-alone network accounting system based on the RADIUS (Remote Authentication Dial-In Service) protocol, the user's password that corresponds to that user name, and the user's service profile containing configuration information unique to the user and the network accounting system.

Using the storage format described above, a set of user data elements may be selected as keywords, such as user name and password. (A keyword is commonly used as a search index in an information repository, such as a database.) Attributes or information that relate to the configuration of the network accounting system and the user that are required by the target system are stored as attribute definitions. For example, dictionary name location 56 may be used to specify the protocol used by the target system, such as the RADIUS (remote access dial-in user service) protocol. Since there may be more than one type of RADIUS protocol, the dictionary name may also include the type of protocol. For instance, the RADIUS protocol having the extensions supported by a vendor A may be listed within the dictionary name location as "VendorA-Radius." Similarly, the RADIUS protocol having the extensions supported by a vendor B may be listed within the dictionary name location as "VendorB-Radius", and the like.

In the same example, attribute name location 58 may hold an attribute name corresponding to an attribute defined in the dictionary listed in dictionary name location 56, such as "IP address". Since attribute name location 58 holds the term "IP address", attribute value location 60 holds the actual value of the IP address. Attribute type location 62 holds the value of the attribute type associated with the IP address attribute in a human-readable format. Attribute type location 62 may be defined to include one of two types of attribute values: "reply_attribute" or "check_item." Those of ordinary skill in the art will readily recognize that the attribute values of reply_attribute and check_item are specific to the attributes defined for the RADIUS protocol and thus, will not require further description other than to describe how the attributes may be included in an attribute definition.

This approach of defining attributes using an attribute definition, such as attribute definition 54(1) may be followed for each attribute defined by a protocol that an integrator seeks to use with target system 18. Moreover, those of ordinary skill in the art will readily recognize that the above approach may also be used for defining configuration information for an application, or equivalent, that requires configuration information to be imported from a source location.

Referring again to FIG. 1, source data adapter 20 is shown having a subscribing element 80, a data validator 82, an attribute definition transcriber 84, and a publishing element 86. Subscribing element 80 and publishing element 86 receive and transmit events, respectively, on communications architecture 24. Subscribing element 80 is registered with information broker 30 to receive the events published by source interface 26, enabling source data adapter 20 through subscribing element 80 to receive user records stored in source table 42 that are each published as an event.

Upon the receipt of each event carrying a user record, data validator 82 validates each user record received. Data validator 82 validates the user record by determining whether an attribute definition includes an attribute name and an attribute type having the proper values, and whether the attribute definition contains a complete set of values. These determinations are based on the specific application or protocol listed in a dictionary name associated with each attribute definition. For example, if an attribute definition defines an attribute of a particular protocol then the attribute name, attribute value, and attribute type listed within the attribute definition must conform to the attribute dictionary of that particular protocol in order to be found valid. An attribute dictionary defines the attribute names, values, and types for a particular protocol, e.g., an attribute dictionary exists for the RADIUS protocol and its variations implemented by various vendors.

For instance, if attribute name location 58 in FIG. 3 contains the string "password," and if the attribute dictionary listed in dictionary name location 56 defines an attribute name of "password", data validator 82 will deem the value held in attribute name location 58 valid because the value held by attribute name location 58 corresponds to one of the attributes used by the protocol defined by dictionary name location 56. In another example, if attribute name location 58 holds the string "pword," and the attributes used by the protocol defined by dictionary name location 56 does not include an attribute name of "pword", data validator 82 will deem the value of attribute name location 58 invalid.

Data validator 82 also validates the content of attribute value location 60 by determining whether the listed attribute value is of the proper value type for the attribute name held in attribute name location 58. For example, if attribute name location 58 contains the term "phone_number" and if the protocol listed in dictionary name location 56 defines a phone number attribute having a numerical value type rather than a string value type, data validator 82 will deem the content within attribute value location 60 invalid because it has a value type that does not match the value type required by the protocol listed for the attribute name.

Data validator 82 also checks for completeness by checking whether a value exists in each attribute definition location that requires a value by the protocol listed in dictionary name location 56. For example, if dictionary name location 56 contains the value "VendorA-Radius", and attribute name location 58 contains an IP address, data validator 82 will determine whether a value exists within attribute type location 62 because the VendorA-Radius value pertains to a protocol that requires an attribute type in addition to an attribute name and attribute value corresponding to the attribute name.

If data validator 82 finds any of the values held by attribute name location 58 or attribute value location 60 invalid, or the attribute definition incomplete, data validator 82 drops the corresponding user record, sends an alert message to an operator, and waits for another event containing another user record to process. Otherwise, data validator 82 repeats the above validation process for each attribute definition listed in a user record.

If data validator 82 finds all attribute definitions valid within a given user record, then the user record is transferred to attribute definition transcriber 84. Attribute definition transcriber 84 converts the human readable form of the dictionary name, attribute name, and attribute type into descriptions that comply with the descriptions that have been standardized for, or are required by, a particular application or protocol used by target system 18. Thus, attribute definition transcriber 84 converts the each attribute definition from a first description, e.g., human readable form, into a second description.

For example, if target system 18 uses the User Control Point product available from Cisco Systems, then attribute definition transcriber 84 will transcribe the value in dictionary name location 56 into a dictionary ID, which consists of a numerical value. If dictionary name location 56 contains "VendorA-Radius", a dictionary ID of "1" may be used, or if dictionary name location 56 contains "VendorB-Radius", a dictionary ID of "2" may be used, and so on. Attribute definition transcriber 84 will also transcribe the value in attribute name location 58 into an attribute name ID. If attribute name location 58 contains the attribute name of "password", attribute definition transcriber 84 will change the value "password" to the number "8" because in the RADIUS protocol, regardless of version, attribute IDs are used instead of attribute names. Hence, the number "8" is used to indicate that a corresponding attribute value is a password.

Attribute definition transcriber 84 may also transcribe the attribute type value in attribute type location 62 from a human-readable form to an encoded numerical form. For example, if the attribute type value is reply_attribute, which is in human-readable form, attribute definition transcriber 84 will transcribe the-attribute type value to an 10 encoded numerical indicator of "0." Similarly, if the attribute type value is check_item, attribute definition transcriber 84 will transcribe the attribute type value to an encoded numerical indicator of "1".

After attribute definition transcriber 84 transcribes all of the attribute definitions in the user record received from data validator 82, source data adapter 20 sends the transcribed data record to target data adapter 22. In accordance with a presently preferred embodiment of the present invention, source data adapter 20 uses publishing element 86 to publish the transcribed data record as an event that can be received by target data adapter 22. As seen in FIG. 1, target data adapter 22 includes a subscribing element 100, a format converter 102 and a publishing element 104. Target data adapter 22 uses subscribing element 100 to receive events of the same event type as the event sent by publishing element 86, enabling target data adapter 22 to receive validated and transcribed data records from source data adapter 20.

Figure 4:
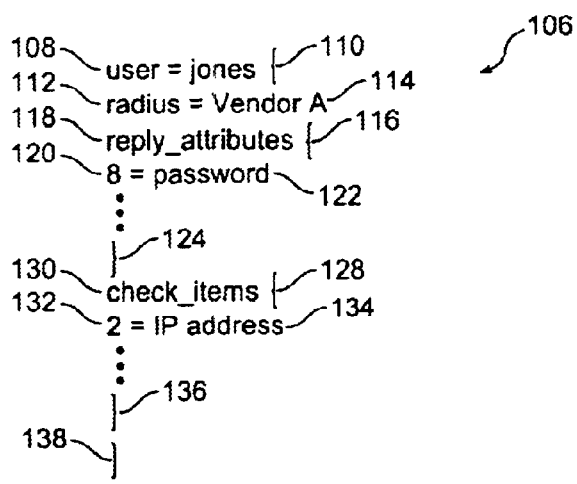
FIG. 4 is a diagram of a storage format for data stored in a target location in accordance with a presently preferred embodiment of the present invention.

Upon receiving an event from source data adapter 20 through subscribing element 100, target data adapter 22 uses format converter 102 to convert the validated and transcribed data record encapsulated by the event from the format described above to a target format. The target format selected should be suitable with the database schema required by target system 18. In accordance with one presently preferred embodiment of the present invention, the target format has the format 106 shown in FIG. 4 and is suitable for a target system, such as the User Control Point product available from Cisco. Systems. Format 106 includes a user keyword 108 equated with the actual name of the user, which is followed by a delimiter such as a left curly bracket 110. After user keyword 108, the dictionary name of an attribute definition within a corresponding validated and transcribed user record is parsed into two parts: protocol name 112 and version name 114. Format 106 also includes a; section for holding information associated with the attributes listed in the user record having the same dictionary name described by protocol name 112 and version name 114. All attributes that have an attribute type value of "reply-attribute" (hereinafter, "reply attributes") are placed after a delimiter such as a left curly bracket 116, which follows a reply attribute header 118. Each reply attribute is then listed starting with the attribute ID set equal to the name of the attribute. For example, a reply attribute may include an attribute ID 120 of "8" and an attribute name 122 of "password."

After all reply attributes have been listed, a right curly bracket 124 is placed after the last reply attribute listed, and all attributes that have an attribute type value of "check_item" (hereinafter "check item attributes") are then listed. All check item attributes are placed after a delimiter such as a left curly bracket 128, which follows a check attribute header 130. Each check item attribute is then listed starting with the attribute ID set equal to the name of the attribute. For example, a check item attribute may include an attribute ID 132 of "2" and an attribute value 134 of "IP address." After the check item attributes have been listed for a particular user record, two delimiters such as a pair of right curly brackets 136 and 138 are placed after the last check item attribute listed. Delimiter/right curly bracket 1*36 corresponds to delimiter/left curly bracket 128 and delimiter/right curly bracket 138 corresponds to delimiter/left curly bracket 110. Format 106 is followed for each user record received for importation. Those of skill in the art will see that other formats could also be used.

Figure 5:
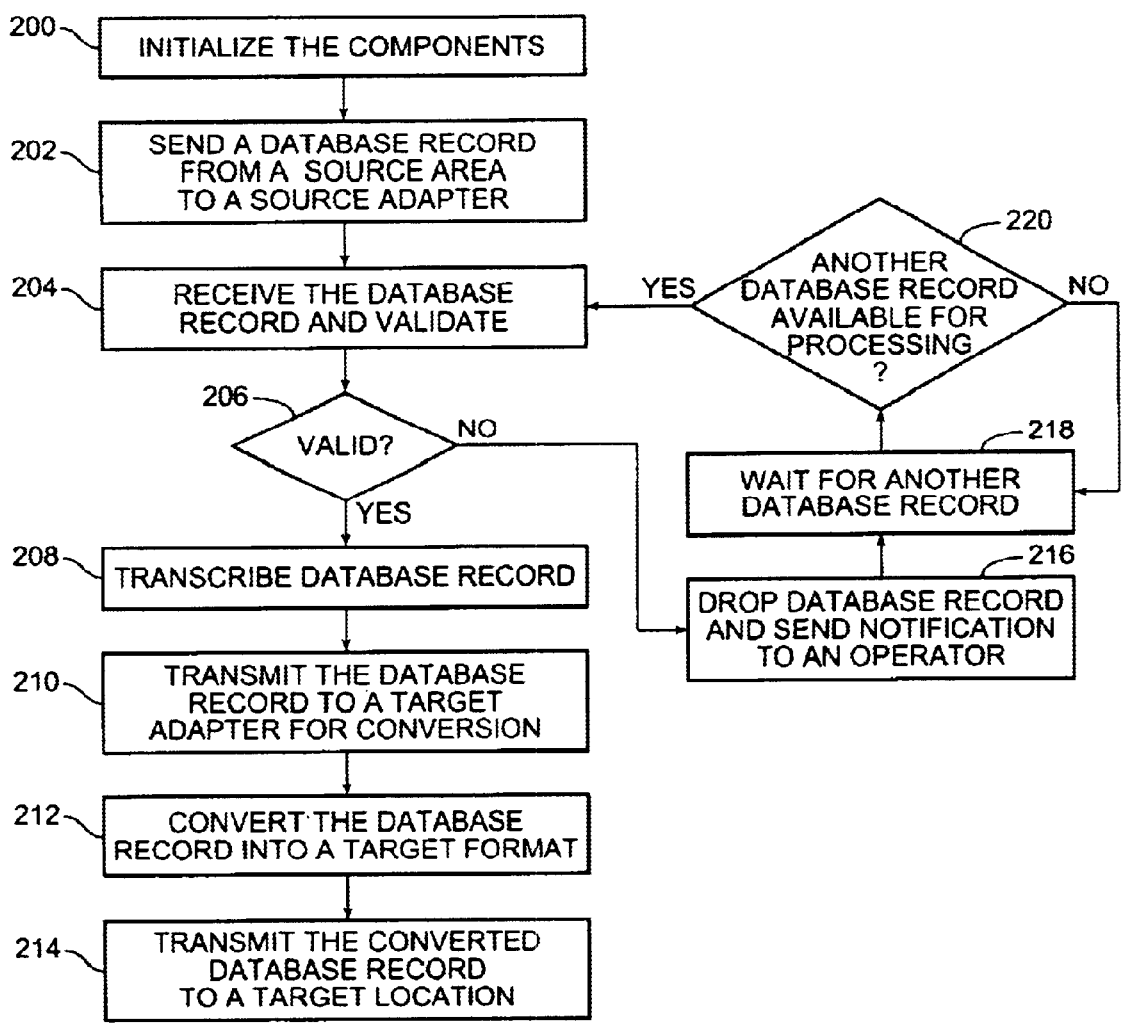
FIG. 5 is a flow diagram of a process for importing data from a source location to a target location in accordance with a presently preferred embodiment of the present invention.

FIG. 5 is a process flow for importing data from a source location to a target location, in accordance with a preferred embodiment of the present invention is shown.

At reference number 200, the components of data transfer interface 10 and communications architecture 24 are initialized. Initialization includes registering the components that transmit or receive events with information broker 30, triggering database trigger 38, or equivalent stored procedure, and storing user data as a user record in a source area, such as storage table 42.

At reference number 202, database trigger 38 sends a user record stored in the source area to source data adapter 20. Since, in a preferred embodiment, a user record is transmitted and received using events, database trigger 38 does not transmit the user record to source data adapter 20 directly. Instead, database trigger 38 relies on source interface 26 to receive the user record and to transmit the user record as an event on communications architecture 24. The event has an event type that corresponds to an event that source data adapter 20 has registered to receive with information broker 30, enabling source data adapter 20 to receive the database record as an event through subscribing element 80.

At reference number 204, source data adapter 20 receives the database record as an event that was published by source interface 26 through information broker 30 and validates the contents of the user record.

At reference number 206, if the contents of the user record are found valid, the process flow proceeds to reference number 208.

If at reference number 206, the contents of the user record are found not valid, reference number 216 is performed. At reference number 216, source data adapter 20 drops the user record and sends an alert message to an operator. Control then passes to reference number 218.

At reference number 218, source data adapter 20 waits to receive another user record.

At reference number 220, if another user record is available for processing, such as a user record published as an event by source interface 26, the process flow returns to reference number 204. Otherwise, source data adapter 20 continues to wait for another user record by returning to reference number 218.

At reference number 208, source data adapter 20 transcribes each attribute definition that may be in the validated user record. The validity analysis and transcription performed by source data adapter 20 for a user record is described above.

At reference number 210, source data adapter 20 transmits the validated and transcribed user record as an event to target data adapter 22 using publishing element 86. The event has an event type that matches an event that target data adapter 22 has registered to receive with information broker 30, enabling target data adapter 22 to receive the validated and transcribed user record as an event through subscribing element 100.

At reference number 212, target data adapter 22 converts the format of the validated and transcribed user record into a format suitable for use by target system 18 using format converter 102. The format conversion performed by format converter 102 for a user record is described above.

At reference number 214, target data adapter 22 transmits the converted user record to target system 18 for storage at a target location, such as target database 14. In accordance with a preferred embodiment of the present invention, the transmission of the converted user record includes using an event. Thus, target data adapter 22 uses publishing element 104 to transmit the converted user record as an event on communications architecture 24. The event has an event type that matches an event that target interface 28 has registered to receive with information broker 30, enabling target interface 28 to receive the converted user record. Target interface 28 receives the event published by target data adapter 22, strips the converted user record from the event, and provides it to DBMS 36 for storage in a target location, such as target database 14, using a protocol or language compatible with DBMS 36, such as SQL.

Those of ordinary skill in the art will readily recognize that the acts listed in the process flow disclosed above do not have to be performed in a lock step manner with each other but may be performed independently. For example, information broker 30 may queue published events it receives so that it may receive the events at a rate independent from the rate it transmits the events to corresponding subscribing elements. In another example, source data adapter 20 and target data adapter 22 may also queue each user record received, enabling each adapter to process each user record at a rate independent from the rate that they receive each user record.

While embodiments and applications of this invention have been shown and described, it would be apparent to those skilled in the art after a perusal of this disclosure that many more modifications than mentioned above are possible without departing from the inventive concepts disclosed. The invention, therefore, is not to be restricted except in the spirit of the appended claims.

We claim:

1. A subscriber management system (SMS) data transfer interface, comprising:
   an SMS data adapter comprising:
      a first subscribing element configured to receive SMS data having a first format and at least one attribute definition described by a first description;
      an attribute definition transcriber configured to transcribe said at least one attribute definition from said first description into a second description; and
      a first publishing element configured to publish said SMS data including said at least one attribute definition having said second description; and
   an authentication, authorization, and accounting (AAA) data adapter comprising:
      a second subscribing element configured to receive said SMS data including said at least one attribute definition having said second description;
      a format converter configured to convert from said first format to a second format said SMS data including said at least one attribute definition having said second description; and
      a second publishing element configured to publish said SMS data having said second format and at least one attribute definition having said second description.

2. The data transfer interface of claim 1, wherein said SMS data adapter further comprises a data validator for validating said at least one attribute definition.

3. The data transfer interface of claim 1, further including an SMS memory for storing said SMS data having said first format.

4. The data transfer interface of claim 3, further including an SMS data interface coupled to said SMS memory.

5. The data transfer interface of claim 4, further including an SMS trigger coupled to said SMS memory and to said SMS data interface.

6. The data transfer interface of claim 1, further including an AAA memory for storing said SMS data having said second format.

7. A method of importing subscriber management system (SMS) data from an SMS location to an authentication, authorization, and accounting (AAA) location, said SMS data having a first format and at least one attribute definition having a first description, said method comprising:
   receiving the SMS data from the SMS location at a second location;
   validating the SMS data;
   transcribing the first description to a second description if the SMS data is valid;
   transmitting the transcribed SMS data from the second location to a third location;
   receiving the transcribed SMS data at the third location; and
   converting the first format to a second format.

8. The method of claim 7, further including storing the SMS data in an SMS memory at the SMS location, wherein the SMS memory has a storage structure according to the first format.

9. The method of claim 7, wherein validating the SMS data includes checking whether said at least one attribute definition includes a value that matches an expected value type.

10. The method of claim 9, wherein said expected value type is a character string.

11. The method of claim 9, wherein said expected value type is a number.

12. The method of claim 9, wherein said expected value type is a date.

13. The method of claim 7, further including transmitting the converted SMS data to an AAA memory at the AAA location, wherein the AAA memory has a storage structure according to said second format.

14. The method of claim 7, wherein converting the first format to said second format includes:
   listing a reply attribute corresponding to the SMS data between a first delimiter and a second delimiter; and
   equating an attribute ID with said reply attribute, said attribute ID corresponding to said reply attribute.

15. The method of claim 14, further including placing a reply attribute header before said first delimiter.

16. The method of 7, wherein converting the first format to said second format includes:
   listing a check item attribute corresponding to the SMS data between a first delimiter and a second delimiter; and
   equating an attribute ID with said check item attribute, said attribute ID corresponding to said check item attribute.

17. The method of claim 16, further including placing a check attribute header before said first delimiter.

18. A subscriber management system (SMS) data adapter for an SMS data transfer interface having an SMS database, an authentication, authorization, and accounting (AAA) database, and an AAA data adapter, the SMS data adapter comprising:
   a subscribing element for receiving SMS data from the SMS database;
   a data validator coupled to said subscribing element;
   an attribute definition transcriber coupled to said data validator; and
   a publishing element coupled to said attribute definition transcriber, wherein SMS data is published to the AAA data adapter.

19. The SMS data adapter of claim 18, wherein said subscribing element receives SMS data having a first format and at least one attribute definition.

20. The SMS data adapter of claim 19, wherein said data validator checks whether said at least one attribute definition includes a value that matches an expected value type.

21. The SMS data adapter of claim 20, wherein said attribute definition transcriber transcribes said at least one attribute definition from a first description to a second description.

22. The SMS data adapter of claim 18, wherein said subscribing element receives SMS data as an event.

23. The SMS data adapter of claim 18, wherein said publishing element transmits SMS data as an event.

24. An authentication, authorization, and accounting (AAA) data adapter for a subscriber management system (SMS) data transfer interface having an SMS database, an SMS data adapter, and an AAA database, the AAA data adapter comprising:
   a subscribing element for receiving SMS data from the SMS data adapter;
   a data format converter coupled to said subscribing element; and
   a publishing element coupled to said data format converter, wherein SMS data is published to the AAA database.

25. The AAA data adapter of claim 24, wherein said subscribing element receives SMS data having a first format.

26. The AAA data adapter of claim 25, wherein said data format converter converts said SMS data from said first format to said second format.

27. The AAA data adapter of claim 24, wherein said SMS data is received by said subscribing element as an event.

28. An apparatus for importing subscriber management system (SMS) data from an SMS location to an authentication, authorization, and accounting (AAA) location, the SMS data having a first format and at least one attribute definition having a first description, the apparatus comprising:

means for receiving the SMS data from the SMS location at a second location;

means for validating the SMS data;

means for transcribing the first description to a second description if the SMS data is valid;

means for transmitting the transcribed SMS data from the second location to a third location;

means for receiving the transcribed SMS data at the third location; and means for converting the first format to a second format.

29. The apparatus of claim 28, further comprising means for storing the SMS data in an SMS memory at the SMS location, wherein the SMS memory has a storage structure according to the first format.

30. The apparatus of claim 28, wherein means for validating the SMS data includes means for checking whether the at least one attribute definition includes a value that matches an expected value type.

31. The apparatus of claim 30, wherein the expected value type is a character string.

32. The apparatus of claim 30, wherein the expected value type is a number.

33. The apparatus of claim 30, wherein the expected value type is a date.

34. The apparatus of claim 28, further comprising means for transmitting the converted SMS data to an AAA memory at the AAA location, wherein the AAA memory has a storage structure according to the second format.

35. The apparatus of claim 28, wherein means for converting the first format to the second format comprises:

means for listing a reply attribute corresponding to the SMS data between a first delimiter and a second delimiter; and means for equating an attribute ID with the reply attribute, the attribute ID corresponding to the reply attribute.

36. The apparatus of claim 35, wherein means for converting the first format to the second format further comprises means for placing a reply attribute header before the first delimiter.

37. The apparatus of 28, wherein means for converting the first format to the second format comprises:

means for listing a check item attribute corresponding to the SMS data between a first delimiter and a second delimiter; and means for equating an attribute ID with the check item attribute, the attribute ID corresponding to the check item attribute.

38. The apparatus of claim 37, wherein means for converting the first format to the second format further comprises means for placing a check attribute header before the first delimiter.

39. A method of subscriber management system (SMS) data adaptation for an SMS data transfer interface having an SMS database, an authentication, authorization, and accounting (AAA) database, and an AAA data adapter, the SMS data having a first format and at least one attribute definition having a first description, the method comprising:

receiving the SMS data from the SMS database;

validating the SMS data;

transcribing the first description to a second description if the SMS data is valid; and transmitting the transcribed SMS data to the AAA data adapter.

40. The method of claim 39, wherein validating comprises checking whether the at least one attribute definition includes a value that matches an expected value type.

41. The method of claim 40, wherein the expected value type is a character string.

42. The method of claim 40, wherein the expected value type is a number.

43. The method of claim 40, wherein the expected value type is a date.

44. A method of authentication, authorization, and accounting (AAA) data adaptation for a subscriber management system (SMS) data transfer interface having an SMS database, an SMS data adapter, and an AAA database, the transcribed SMS data having a first format and at least one attribute definition having a second description, the method comprising:

receiving the transcribed SMS data from the SMS data adapter;

converting the first format to a second format; and transmitting the converted SMS data to the AAA database.

45. The method of claim 44, wherein converting comprises:

listing a reply attribute corresponding to the SMS data between a first delimiter and a second delimiter; and equating an attribute ID with the reply attribute, the attribute ID corresponding to the reply attribute.

46. The method of claim 45, wherein converting further comprises placing a reply attribute header before the first delimiter.

47. The method of 44, wherein converting comprises:

listing a check item attribute corresponding to the SMS data between a first delimiter and a second delimiter; and equating an attribute ID with the check item attribute, the attribute ID corresponding to the check item attribute.

48. The method of claim 47, wherein converting further comprises placing a check attribute header before the first delimiter.

49. A computer-readable medium having stored thereon computer-executable instructions for performing a method of subscriber management system (SMS) data adaptation for an SMS data transfer interface having an SMS database, an authentication, authorization, and accounting (AAA) database, and an AAA data adapter, the SMS data having a first format and at least one attribute definition having a first description, the method comprising:

receiving the SMS data from the SMS database;

validating the SMS data;

transcribing the first description to a second description if the SMS data is valid; and transmitting the transcribed SMS data to the AAA data adapter.

50. The computer-readable medium of claim 49, wherein validating comprises checking whether the at least one attribute definition includes a value that matches an expected value type.

51. The computer-readable medium of claim 50, wherein the expected value type is a character string.

52. The computer-readable medium of claim 50, wherein the expected value type is a number.

53. The computer-readable medium of claim 50, wherein the expected value type is a date.

54. A computer-readable medium having stored thereon computer-executable instructions for performing a method of authentication, authorization, and accounting (AAA) data adaptation for a subscriber management system (SMS) data transfer interface having an SMS database, an SMS data adapter, and an AAA database, the transcribed SMS data having a first format and at least one attribute definition having a second description, the method comprising:

receiving the transcribed SMS data from the SMS data adapter;

converting the first format to a second format; and transmitting the converted SMS data to the AAA database.

55. The computer-readable medium of claim 54, wherein converting comprises:

listing a reply attribute corresponding to the SMS data between a first delimiter and a second delimiter; and equating an attribute ID with the reply attribute, the attribute ID corresponding to the reply attribute.

56. The computer-readable medium of claim 55, wherein converting further comprises placing a reply attribute header before the first delimiter.

57. The computer-readable medium of 54, wherein converting comprises:

listing a check item attribute corresponding to the SMS data between a first delimiter and a second delimiter; and equating an attribute ID with the check item attribute, the attribute ID corresponding to the check item attribute.

58. The computer-readable medium of claim 57, wherein converting further comprises placing a check attribute header before the first delimiter.

* * * * *

UNITED STATES PATENT AND TRADEMARK OFFICE
CERTIFICATE OF CORRECTION

PATENT NO. : 6,718,332 B1
DATED : April 6, 2004
INVENTOR(S) : Aravind Sitaraman et al.

It is certified that error appears in the above-identified patent and that said Letters Patent is hereby corrected as shown below:

Column 6,
Line 17, replace "4User" with -- User --.

Signed and Sealed this

Fourteenth Day of September, 2004

JON W. DUDAS
*Director of the United States Patent and Trademark Office*